US012802593B2

(12) United States Patent
Ulrich-Horn

(10) Patent No.: US 12,802,593 B2
(45) Date of Patent: Nov. 17, 2026

(54) PLANAR SEALING ELEMENT

(71) Applicant: SECURIKETT ULRICH & HORN GMBH, Münchendorf (AT)

(72) Inventor: Marietta Ulrich-Horn, Mödling (AT)

(73) Assignee: SECURIKETT ULRICH & HORN GMBH, Munchendorf (AT)

( * ) Notice: Subject to any disclaimer, the term of this patent is extended or adjusted under 35 U.S.C. 154(b) by 0 days.

(21) Appl. No.: 18/574,677

(22) PCT Filed: Jul. 26, 2022

(86) PCT No.: PCT/EP2022/070952

§ 371 (c)(1),
(2) Date: Dec. 27, 2023

(87) PCT Pub. No.: WO2023/006752

PCT Pub. Date: Feb. 2, 2023

(65) Prior Publication Data

US 2024/0321145 A1 Sep. 26, 2024

(30) Foreign Application Priority Data

Jul. 26, 2021 (EP) .................................... 21187818

(51) Int. Cl.
*G09F 3/03* (2006.01)
*B65D 53/00* (2006.01)
(Continued)

(52) U.S. Cl.
CPC ........... *G09F 3/0341* (2013.01); *B65D 53/00* (2013.01); *C09J 7/21* (2018.01); *G09F 3/0292* (2013.01);
(Continued)

(58) Field of Classification Search
CPC .................................................... G09F 3/0292
See application file for complete search history.

(56) References Cited

U.S. PATENT DOCUMENTS 9,199,771 B2 * 12/2015 Kasper .................. B32B 27/322
2006/0182955 A1 * 8/2006 Sellars .................. G09F 3/0292 428/40.1
(Continued)

FOREIGN PATENT DOCUMENTS

DE 202007001713 U1 6/2007
DE 102012221796 B3 * 3/2014 ............ B32B 27/08
(Continued)

OTHER PUBLICATIONS

DE-102012221796-B3 English Translation (Year: 2012).*
(Continued)

*Primary Examiner* — Kyle R Grabowski
(74) *Attorney, Agent, or Firm* — Workman Nydegger

(57) ABSTRACT

The present invention relates to a planar sealing element (1) for application to a substrate (2), comprising a carrier layer (3) and several functional layers (4),
the functional layers (4) comprising at least one colour display layer (5) and an adhesion-controlling layer (6),
the sealing element (1) furthermore comprising an adhesive layer (8) for attachment to the substrate (2),
the functional layers (4) being arranged between the carrier layer (3) and the adhesive layer (8),
wherein the carrier layer (3) is at least partially detachable from the functional layers (4) in order to bring the sealing element (1) from a first state (9) to a second state (10), with the second state (10) not being convertible into the first state (9),
the sealing element (1) in the second state (10) comprising a peeled-off layer (11), comprising at least the at least partially detached carrier layer (3), and a residue (12), comprising at least the adhesive layer (8) and at least parts of the at least one colour display layer (5),
the carrier layer (3) being made of paper, wherein it is envisaged, according to the invention, that the carrier
(Continued)

layer (3) is translucent so that the peeled-off layer (11), in at least one area when the peeled-off layer (11) is arranged congruently on the residue (12), has a different colour impression than the same area of the carrier layer (3) in the first state (9) in a viewing direction toward the carrier layer (3).

19 Claims, 4 Drawing Sheets

(51) Int. Cl.
*C09J 7/21* (2018.01)
*G09F 3/00* (2006.01)
*G09F 3/02* (2006.01)

(52) U.S. Cl.
CPC ..... *B65D 2203/02* (2013.01); *C09J 2203/334* (2013.01); *C09J 2203/338* (2013.01); *G09F 2003/021* (2013.01); *G09F 2003/0213* (2013.01); *G09F 2003/0276* (2013.01)

(56) References Cited

U.S. PATENT DOCUMENTS

2009/0322538 A1 * 12/2009 Kobren ................. G09F 3/0292 427/258
2022/0208027 A1 6/2022 Ulrich-Horn

FOREIGN PATENT DOCUMENTS

DE 102012218033 A1 * 4/2014 ........... G09F 3/0292
EP 1278173 A2 1/2003
EP 2747059 A1 6/2014
EP 3726506 A1 10/2020

OTHER PUBLICATIONS

DE-102012218033-A1 English Translation (Year: 2012).*
GSM Paper Guide (Note that 2022 is not prior art, however this states known properties of paper) https://www.uniquelycreative.com.au/blogs/news/what-is-gsm-for-paper-a-paper-thickness-and-weight-guide?srsltid=AfmBOooNdICAKR1GI4nDau_hktjvA9E8tP1b99dou6XzHhacPclxde7Y (Year: 2022).*
Calendaring Your Paper https://wmuprintmaking.wordpress.com/wp-content/uploads/2013/01/calendaring-your-paper.pdf (Year: 2017).*
Delta E https://www.viewsonic.com/library/creative-work/what-is-delta-e-and-why-is-it-important-for-color-accuracy/ (Year: 2021).*
International Search Report and Written Opinion received for PCT Patent Application No. PCT/EP2022/070952, mailed on Nov. 18, 2022, 17 pages (7 pages of English Translation and 10 pages of Original Document).

* cited by examiner

PLANAR SEALING ELEMENT

FIELD OF THE INVENTION

The present invention relates to a planar sealing element for application to a substrate, comprising a carrier layer and several functional layers, the functional layers comprising at least one colour display layer and an adhesion-controlling layer, the sealing element furthermore comprising an adhesive layer for attachment to the substrate, the functional layers being arranged between the carrier layer and the adhesive layer, wherein the carrier layer is at least partially detachable from the functional layers in order to bring the sealing element from a first state to a second state, with the second state not being convertible into the first state, the sealing element in the second state comprising a peeled-off layer, comprising at least the at least partially detached carrier layer, and a residue, comprising at least the adhesive layer and at least parts of the at least one colour display layer, the carrier layer being made of paper, and a system made of a sealing element as well as a packaging element for goods.

PRIOR ART

Sealing elements, e.g., sealing films, are per se already known in the prior art. They are used therein for security purposes. In addition to protecting containers or packagings from unauthorized opening, planar sealing elements can also be used for covering confidential information or for fixing tamper-proof features. The confidential information can be, for example, a pin code or an identity code. Only by removing the carrier layer, the confidential information becomes visible to the viewer. The tamper-proof features can be, for example, a hologram.

Such sealing films known in the prior art are all made of plastic. The use of plastic as a carrier layer can be ecologically disadvantageous for paper-based surfaces to which the sealing films are applied. If paper-based surfaces are disposed of together with the sealing film and supplied to a treatment or, respectively, recycling process, the quality of the processed raw material (paper) might suffer on the one hand. On the other hand, the raw material of the carrier layer (plastic) is not fed into a closed circuit and is thus lost as a raw material. Due to the small volume of sealing films in relation to the target surface onto which sealing films are applied, they are generally not subject to mechanical recycling, but are thermally recycled, if at all. If such plastic-based sealing films are carelessly disposed of in the environment, they will not rot, but will remain in the environment for a long time.

For example, AT 9365 U discloses a sealing film which clearly and irreversibly indicates that a sealing element has indeed been opened. In this case, however, the sealing film, more precisely the carrier layer thereof, is made of plastic, preferably of polypropylene.

EP 3726506 A1 also shows a sealing film which serves for securing items that are valuable, for example. Their carrier layer, a carrier film, is also manufactured from transparent plastic, preferably from polypropylene or polyethylene or polyethylene terephthalate.

All sealing elements or, respectively, sealing films known in the prior art are based on a carrier layer made of plastic, like those mentioned as examples. However, it is becoming more and more important to produce ecologically beneficial products in order to meet demands of environmental protection, which is becoming increasingly important for society. Packagings are assessed for their recyclability in line with legal and social requirements in terms of a recycling economy. The assessment is conducted by various certification bodies. This means that, if the conventional sealing element is applied to an environmentally compatible packaging made, for example, of cardboard, the combination of a sealing element with a plastic carrier layer and a packaging can no longer be classified as environmentally friendly. In addition, work steps for removing and properly disposing of such plastic sealing elements may have to be incorporated, if necessary.

OBJECT OF THE INVENTION

It is now the object of the present invention to provide a planar sealing element which overcomes the disadvantages of the prior art and is ecologically beneficial, wherein the security properties of the planar sealing element or, respectively, the resistance to manipulation is/are the same or even better than those of sealing films known in the prior art.

PRESENTATION OF THE INVENTION

The object that is posed is achieved by a planar sealing element according to claim 1.

Claim 1 is based on a planar sealing element for application to a substrate, comprising a carrier layer and several functional layers, the functional layers comprising at least one colour display layer and an adhesion-controlling layer, the sealing element furthermore comprising an adhesive layer for attachment to the substrate, the functional layers being arranged between the carrier layer and the adhesive layer, wherein the carrier layer is at least partially detachable from the functional layers in order to bring the sealing element from a first state to a second state, with the second state not being convertible into the first state, the sealing element in the second state comprising a peeled-off layer, comprising at least the at least partially detached carrier layer, and a residue, comprising at least the adhesive layer and at least parts of the at least one colour display layer, the carrier layer being made of paper.

The carrier layer made of paper according to the invention is a particularly ecologically advantageous form of a sealing element for security purposes of, for example, folding cartons made of paper or cardboard. It is advantageous particularly that the sealing element according to the invention can be recycled together with the packagings made of paper or cardboard.

A carrier layer made of paper means that the material of the carrier layer does not contain any plastic, i.e., that the carrier layer is not manufactured from a cellulose-plastic mixture, for example. It is preferred that the carrier layer made of paper is not provided with a plastic layer. However, it cannot be ruled out that an additional plastic layer or lamination is applied to the carrier layer made of paper, which additional layer is so thin that the recyclability of the carrier layer as a paper is not restricted. This includes, for example, laminating films with a thickness of a few micrometers, e.g., less than 15 micrometers. It is also not ruled out that the carrier layer made of paper is printed with paint so as to appear coloured and/or to display information and/or patterns. Another significant advantage of the invention is that the carrier layer is obtained from a renewable resource.

It is conceivable, for example, that the planar sealing element made of paper is applied to a packaging carton and can subsequently be disposed of and recycled together with it. This eliminates the need to remove the sealing element from the packaging carton in a recycling or processing plant, which is aimed at improving the quality of the recyclate. Paper is a renewable resource with an established recycling system.

In addition, paper entails other significant advantages. For example, a sealing element made of paper is even safer than conventional plastic-based sealing elements as it renders any manipulations that may have been carried out even easier to detect because paper naturally tears much more quickly than plastic. A targeted separation using a sharp object or the like is therefore made almost impossible.

In addition, especially thin paper in general also tends to curl up at the edges when peeled from a surface to which it was previously bonded. The paper therefore undergoes a certain deformation that is very difficult to reverse. This means that unnoticed opening and re-closing is made even more difficult.

Furthermore, in a carrier layer made of paper, a manipulation of the sealing element with water also becomes visible very easily due to the permeability of paper with respect to liquids. Since the water can diffuse through the carrier material made of paper, the functional layers anchored in the paper detach at least largely from the carrier material, especially when the carrier layer is removed, and remain on the substrate together with the adhesive layer at least for the most part. This is evident especially in embodiments of the invention in which symbols become visible when the sealing element is transferred from the first to the second state, since, in the damp or, respectively, wet state of the sealing element, only the carrier layer itself is removed without a symbol which can be rendered visible. If the carrier layer is removed in this state, it is no longer possible for the carrier layer to be stuck back again without being noticed, since the carrier layer no longer has any adhesive properties. At the same time, an attempt to place it back can be visually perceived due to a milky-white appearance of the paper of the carrier layer. The sealing element is no longer functional as intended according to the invention, it is namely not possible for the sealing element in the damp, wet or subsequently dried state to be transferred from a first state to a second state. Therefore, due to the milky and cloudy appearance of the paper of the carrier layer, an optical colour change can be perceived at least in those partial areas in which the functional layers have detached together with the adhesive layer when the sealing element has re-dried. Furthermore, if the sealing element has been removed in a wet or damp state, whereby the carrier layer has detached from the functional layers and the adhesive layer at least in a partial area, the sealing element cannot be restored even after the individual layers have dried. This means that the planar sealing element can no longer be rendered functioning according to the invention even if the detached layer is stuck back and then allowed to dry, i.e., the planar sealing element cannot be transferred from a first state to a second state so that the colour effect becomes visible. In this way, it is therefore not possible to improperly collect and reuse sealing elements that have been washed.

In the case, however, that the sealing element is not opened, i.e., the carrier layer is not detached at least in some areas from the functional layers and the adhesive layer when it has become damp or even wet, it is then nevertheless possible to continue using the sealing element normally as soon as it has re-dried. After drying has taken place, the sealing element can be brought from the first state to the second state very easily, as intended according to the invention, and continues to be fully functional. This also applies to sealing elements in which a specific symbol is displayed in the second state. After drying, this embodiment of the invention will also function again.

In order to be able to even better indicate attempts at manipulation using water or another liquid, the planar sealing element can additionally have a water-soluble paint. In this case, moistening or, respectively, wetting the sealing element would release the water-soluble paint, rendering the manipulation of the sealing element even more easily visible.

In the context of the sealing element, planar means that the width and the length of the sealing element are significantly larger than the height or, respectively, the thickness. The sealing element is preferably a label for which the length and the width have been determined, or an adhesive tape, which means that there is a band of a defined width and the length can be determined by the user him- or herself.

In this case, it is envisaged according to the invention that the carrier layer is translucent so that the peeled-off layer, in at least one area in which no or only small portions of the at least one colour display layer adhere when the peeled-off layer is arranged congruently on the residue, has a different colour impression than the same area of the carrier layer in the first state in a viewing direction toward the carrier layer. Thus, the paper must have either complete transparency or a certain degree of translucency for this effect to occur.

Transparency in the sense of the present invention refers to an optical property of the planar sealing element. Broadly speaking, transparency is understood as the ability of matter to allow electromagnetic waves to pass through, which, in this case, refers in particular to light, i.e., to the spectral range of electromagnetic radiation that is visible to humans. The materials are therefore referred to as light-transmissive. When it comes to light-transmissive materials, a distinction is made between see-through and translucid materials. The light transmission depends not only on the structure of the respective material, but also on the respective layer thickness. In particular, a carrier layer with a milky cloudiness, which is thus translucid, is encompassed by the invention. In colloquial terms, this is also referred to as "semi-transparent" or translucent. A measurement of the transparency of the carrier layer or, respectively, of the paper used for the production of the carrier layer is conducted by a measuring method known in the prior art, namely ISO 2470. It is noted at this point that, in the following, "transparent" means a transparency or translucency of 100% and "translucent" means a translucency of 20% to 99.99%. The term "opacity" is also used below, with opacity being the reciprocal value of translucency so that translucency is of course also possible by indicating the corresponding opacity values. However, sealing elements with opaque carrier layers are not claimed by the present invention, but are also mentioned only for the sake of completeness.

The carrier layer can therefore be either transparent, i.e., see-through, or translucent, i.e., translucid, however, according to the invention, translucent carrier layers are provided. The transparency or, respectively, the translucency of the paper of the carrier layer is achieved by the thickness of the carrier layer and/or the smoothness of the paper and/or by the compression of the paper during its production, whereby smoothness and compression can be achieved, for example, by calendering.

Advantageously, the transparency or, respectively, the translucency of the carrier layer made of paper is 20% to 100%, preferably 50% to 100%. By applying the at least one functional layer to the carrier layer, the natural roughness on the surface of the paper is reduced. The carrier layer then appears less cloudy or milky, hence more transparent. If the carrier layer is detached from the functional layers, the carrier layer will again appear milkier or, respectively, less transparent. This changed colour impression of the detached carrier layer persists even if the user attempts to reapply said layer to the residue, since there will always remain air between the carrier layer and the residue as both exhibit a roughness or surface structure which prevents them from being completely positioned back in relation to each other. In addition, the carrier layer made of paper generally tends to deform after having been detached so that the transfer from the second to the first state is made even more difficult. The planar sealing element can be transferred from a first state to a second state, the transfer occurring by at least partially detaching the carrier layer from the functional layers. The result of this transfer from a first to a second state is a changed colour impression. The latter is provided by the fact that a carrier layer which is not completely transparent but only translucid is arranged on the functional layers in the first state.

If the carrier layer is now at least partially removed, the underlying functional layer, i.e., a colour display layer, for instance, is revealed, meaning that the residue with the functional layer appears more intensely coloured, i.e., no longer clouded in a milky fashion. That is to say, the carrier layer itself normally appears milky and cloudy and thus assumes the function of a milky-white colour layer. When the carrier layer is peeled off, a residue remains and the carrier layer appears far more milky. Namely, when the layers are applied, the colour display layer and the carrier layer are applied in an arrangement so close together that the functional layer, in particular a colour display layer, partially penetrates the carrier layer. The security against manipulation arises because, after separation, the carrier layer or, respectively, the peeled-off layer cannot be connected to the residue as closely anymore as during the manufacturing process. Furthermore, the colour of a colour display layer viewed through the peeled-off layer no longer appears as intense as before the manipulation.

If the peeled-off layer is placed back congruently on the residue, then the peeled-off layer will have a different colour impression than the same area of the carrier layer in the first state in a viewing direction toward the carrier layer. This means that, if a viewer looks at a sealing element according to the invention in the first state, it will appear to them visually different than when they look at the sealing element at the same spot in the second state of the sealing element. However, for this purpose, the peeled-off layer must be placed back essentially congruently on the residue. Essentially congruently means that, if possible, the peeled-off layer should be placed back on the residue in the same way as it was connected to the residue in the first state.

In a sealing element not according to the invention with a transparent carrier layer, the changed colour impression is achieved by the fact that, when the sealing element is transferred from the first state to the second state, portions of the colour can continue to adhere to the carrier layer. If the peeled-off layer is now placed back congruently on the residue in the second state, air will naturally remain between the residue and the peeled-off layer. As a result, the colour impression of the sealing element changes for a viewer.

One of the advantages of the present invention is that, by way of comparison, when a transparent plastic film is used as a carrier, this milky-white colour layer would have to be applied separately, which, in this case, is inherent to the nature of the paper due to its roughness and no further change is required for achieving such a milky and cloudy appearance.

However, it goes without saying that said changed colour impression naturally occurs only in those areas of the carrier layer in which no or only small portions of the at least one colour display layer adhere in the second state. In the remaining areas, i.e., in those areas in which colour continues to adhere, the changed colour impression is not present or, respectively, is present only in a barely noticeable fashion. Small portions mean in particular that particularly paint residues can continue to adhere to the carrier layer after the transfer from the first to the second state. In some areas, it is also possible that larger paint residues will adhere, in this case, however, the full thickness of the colour display layer will usually no longer adhere, but rather a part of the thickness, for example half, of the colour display layer will remain on the residue, while the other part, for example the other half, will remain attached to the carrier layer.

In order to be able to discern this colour effect, the peeled-off layer must be placed back congruently on the residue. This is done by pressing the peeled-off layer back onto the residue. However, the colour display layer or, respectively, the residue and the carrier layer can no longer be bonded to each other as well as during the manufacturing process of the planar sealing element. The deformation of the carrier layer made of paper also contributes to this. The carrier layer or, respectively, the peeled-off layer indeed curls up preferably at the edges when it is transferred to the second state.

The reason for the observed effect, i.e., the high transparency in the first state, is that the paper has a rough surface, which is due to the distances between the individual paper particles. If paint is now applied to the paper, it fills the gaps, whereas, on the other hand, high opacity returns in the second state because the individual paper particles are again exposed, i.e., the paint is withdrawn from the spacings.

The simplest embodiment of the planar sealing element according to the invention can essentially be described as follows: Between the carrier layer and the adhesive layer, only an adhesion-controlling layer and a colour display layer are arranged as functional layers.

In the second state, the sealing element according to the invention comprises a peeled-off layer, comprising at least the carrier layer, and a residue, comprising at least the adhesive layer and remaining adhered to the substrate. As a rule, a colour display layer or a similar layer is provided directly on the adhesive layer.

In the simplest embodiment of the planar sealing element according to the invention as described above, the colour effect according to the invention is achieved just by removing the carrier layer. This means that, in a first state of the planar sealing element, the sealing element appears, for example, blue over its entire surface, since the colour display layer is coloured blue and shines through the translucent paper. By removing the peeled-off layer, the sealing element is transferred to a second state in which the colour appearance of the residue is significantly more intense. This results from the fact that the carrier layer will generally appear milky-white so that the colour of the functional layers will of course appear more intense without an overlying carrier layer.

In principle, the carrier layer made of paper can be colourless in design or can appear coloured for the application according to the invention. Colourless means that no additional paint has been admixed in order to dye the carrier layer beyond its natural whitish appearance, while such paints have been added when it is coloured. A coloured carrier layer made of paper can still have a transparent or translucent or opaque design.

Of course, the compositions of the paper can vary with regard to the pulp content and/or further additives. In general, papers according to the invention are understood to be papers which are single-layered and have a mass per unit area of 8 g/m$^2$ to 150 g/m$^2$, preferably of 30 g/m$^2$ to 120 g/m$^2$, particularly preferably of 50 g/m$^2$.

Due to the fact that a carrier layer made of paper is generally not completely transparent, the carrier layer usually appears white or at least milky-white. As a result, the carrier layer itself already assumes the function of a colour display layer. In contrast to conventional carrier layers made of completely transparent plastic, it is thus not necessary to first apply an opaque white layer or another colour layer as the first colour display layer, but the carrier layer can be used directly for increasing the contrast when the planar sealing element is transferred from a first to a second state.

When the removable layer is now peeled off, the colour display layer is completely or at least partially detached from the carrier layer or, respectively, out of the carrier layer. Due to the fact that the carrier layer is usually white or, respectively, milky-white, the residue appears much more intensely coloured after the removable layer has been peeled off, i.e., more intensely dark grey or dark blue in the example mentioned. If an attempt is subsequently made to apply the peeled-off layer comprising the carrier layer to the residue, it is not possible to achieve such a good connection of the colour display layer with the carrier layer as before the removal so that the planar sealing element appears less intense in colour than before the removal of the removable layer. This means that the white or, respectively, milky-white appearance of the carrier layer is much more pronounced, whereby it is possible to accurately detect that the planar security element has been opened.

In one embodiment of the invention, it is envisaged that all layers are transparent or have translucency at least in a congruent surface area. In this case, the carrier layer is always translucent, whereas the remaining layers are transparent or have translucency.

Thanks to such a configuration of the planar sealing element, it advantageously becomes possible that, when the sealing element is applied to a substrate, e.g., to a packaging or the like, information is still identifiable or readable on the substrate. Identifiable or, respectively, readable means that it is possible to identify or, respectively, read the information both by the naked eye of a human observer and alternatively with electronic support.

Thanks to this embodiment of the invention, it is made possible in general to be able to read also information and/or symbols which are arranged on the substrate below the sealing element, i.e., between the adhesive layer and the substrate, e.g., the packaging material. It is therefore not necessary to detach or open the sealing element in order to be able to read the information. At the same time, the information remains readable even if the sealing element was detached during the opening of the package, for example. It is a common, often legally regulated provision that information, in particular the batch, expiry date and other codings, must remain readable by sealing and subsequently opening the packaging, respectively. In addition, the information or, respectively, the symbol on the packaging material is also protected from manipulation of the information, e.g., by erasing or overwriting, by the sealing element that is stuck over it.

In order to be able to identify the information, it is of course necessary that all the layers essentially in the same surface area are transparent or have translucency. It is particularly advantageous if the sealing element has an opacity between 0% and 80%, preferably between 0% and 50%. The opacity of the functional layers is measured according to ISO 2471.

In this way, it is ensured that information arranged on the substrate below the adhesive layer is identifiable for a viewer even if the planar sealing element is in a first state, i.e., in the closed state. The information is thereby also identifiable if the carrier layer is arranged additionally on the functional layers. The sealing element can, for example, also have an opacity of 15%, 25%, 35%, 45%, 55%, 65% or 75%.

The transparency of the functional layers or, respectively, of the adhesive layer is achieved by the thickness of the layers and/or the proportion of colour pigments in the layers.

If the functional layers and the adhesive layer are transparent or, respectively, translucent only in a congruent surface area, it is possible to identify information placed on the substrate below this surface area, while the remaining part of the sealing element can, at the same time, have an opaque design.

It is particularly advantageous in this context if the entire sealing element has an opacity between 0% and 80%, preferably between 0% and 50%. In this way, it can be ensured that the information on the substrate can be identified in any case.

In order to enhance the translucency effect of the carrier layer, it is envisaged in one embodiment of the invention that the functional layers and the adhesive layer are transparent or, respectively, translucent particularly over the entire surface of the sealing element. Via transparent or, respectively, translucent functional layers, symbols and/or information arranged below the colour display layer and above the adhesive layer can be identified or, respectively, read even with a sealing element in the first state.

Alternatively, with a translucent design of all layers at least in a congruent surface area, it can also be possible that the information cannot be identified or, respectively, read precisely, but can only be guessed. This means that it is possible to discern that there is something below the sealing element, e.g., a code, but it cannot be identified precisely what that is. For actually identifying or, respectively, reading the code, it is then necessary for the sealing element to be opened.

In order to prevent information arranged on the substrate from being identified or, respectively, read by a sealing element and to be able, at the same time, to generate a particularly high contrast between the first and second states, it is envisaged in a further embodiment of the invention that the carrier layer is translucent and the adhesive layer and/or the functional layers is/are opaque at least in a congruent surface area.

Due to the complete opacity of the adhesive layer and/or the other functional layers in this congruent or, respectively, essentially congruent area, it is ensured that information arranged (in particular printed, embossed, etched, lasered) on the substrate cannot be identified in the first state. However, a code which nevertheless is applied, for example, to the functional layers, could be identified, for instance, in the second state of the sealing element, i.e., when the peeled-off layer has been detached.

At the same time, what is achieved by the opaque adhesive layer and/or the opaque functional layers is that the contrast of the colour effect according to the invention can be discerned particularly well. This means that, due to the intense and, at the same time, opaque colouring of the adhesive layer and/or the colour display layers, the milky and cloudy appearance of the carrier layer becomes even better visible when the sealing element is transferred from a first state to a second state. Because of the intense colouring of the functional layers or, respectively, the adhesive layer, a particularly clearly visible colour effect of the milky and cloudy carrier layer is achieved, since the colour distance from the first to the second state changes in a way that can be discerned very well by the human eye.

If the planar sealing element is used with opaque functional layers and/or an opaque adhesive layer, the sealing element appears particularly intensely coloured in a first state, for example blue, grey or green. If the sealing element is now transferred to a second state and the peeled-off layer is placed back congruently on the residue, a particularly high-contrast colour effect can be seen. The carrier layer now has a noticeable milky-white colouring so that the colouring of the residue underneath is much less pronounced. Such a pronounced colour effect can be discerned very easily and quickly by an observer.

For this embodiment of the invention, opacities of the adhesive layer and/or the functional layers in the range from 30% to 100%, preferably from 50% to 100%, are particularly advantageous. The opacity of the functional layers is measured according to ISO 2471.

In this context, it is particularly advantageous if the entire sealing element has an opacity between 30% and 100%, preferably between 50% and 100%. As a result, it can be ensured that the information on the substrate cannot be identified. The opacity of the functional layers is measured according to ISO 2471.

In order to prevent information arranged on the surface of the substrate below the sealing element from being identified in the first state in a viewing direction toward the carrier layer, while allowing, at the same time, that information is identified in the sealing element when the sealing element is transferred to the second state, it is envisaged in a further embodiment not according to the invention that the carrier layer is opaque.

This means that, when a viewer looks at the carrier layer, they cannot see the remaining sealing element located underneath. However, if they transfer the sealing element from a first to a second state, they can identify the residue and any information possibly arranged thereon.

However, if only the carrier layer has an opaque design, whereas the other layers have a translucent or transparent design, it is possible to see through the remaining layers after the transfer to the second state.

If such a sealing element is applied, for example, to a packaging material made of glass, any manipulation of the sealing element can be detected through the transparent glass packaging, since the planar sealing element exhibits the colour effect according to the invention of course also during the transfer from a first to the second state. If the detached layer is now placed back on the residue, a colour effect can be detected through the packaging material made of glass, i.e., from the side of the adhesive layer.

For a layer, in particular the carrier layer, to be described as opaque, namely as non-transparent, the opacity amounts to at least 80%, preferably 92% to 96% and particularly preferably 97% to 100%. The opacity of the carrier layer is measured according to ISO 2471. However, sealing elements with opaque carrier layers are not claimed by the present invention, but are mentioned, too, only for the sake of completeness.

An environmentally friendly and readily reusable sealing element is thereby likewise created, wherein a symbol or a code hidden in the functional layers will indeed be detectable in the second state of the sealing element, but not in a state of having been stuck back. In the state of having been stuck back, the hidden symbol would be detectable only from the underside of the sealing element if said underside is visible through glass or a translucid object.

That is, in principle, all exemplary embodiments of course also work with opaque paper, but it is noted that the preferred embodiments have a carrier layer made of paper that appears milky or is translucid, i.e., paper with a translucency in the range from 90% to 40%, preferably from 75% to 60%.

So as to achieve a particularly noticeable change in the colour impression of the planar sealing element, which is transparent or translucent with respect to all layers at least in a congruent surface area, it is envisaged in one embodiment of the invention that the area of the peeled-off layer with no or only small portions of the at least one colour display layer adhere to when the peeled-off layer is arranged congruently on the residue has a colour distance Delta E ($\Delta E$) of more than 0 to 7.0, preferably of at least 0.1 to 5.0, and particularly preferably of about 0.1 to 3.0, as compared to the same area of the carrier layer in the first state in a viewing direction toward the carrier layer. This change in the colour distance Delta E ($\Delta E$) can be determined by means of ISO 11664, e.g., according to ISO 11664-4 or ISO 11664-6.

Such transparent sealing elements not according to the invention or, respectively, such translucent sealing elements according to the invention, i.e., in which both the carrier layer and the functional layers and the adhesive layer are transparent or, respectively, translucent, and which therefore allow the human eye and/or electronically supported reading devices, e.g., cameras, to identify or, respectively, to read a text or a code underneath a sealing element in the first and second states, preferably have an opacity of 0% to 80%, preferably of 0% to 50%. This opacity can be determined by ISO 2471.

The difference between colours is indicated by the colour distance Delta E, which represents the coordinate difference in the Lab or Luv colour space. Since these colour spaces are visually equidistant, this value can therefore be used for the visible difference between 2 colours. The visual perception of difference is not the same for all colours, but it can be said that the value Delta E=1 has generally been set as the limit of the visible colour difference. In order to discern the colour difference, samples, i.e., the sealing elements to be measured, must be viewed for a longer period of time (around 20 seconds for small Delta E values). Generally speaking, with Delta E<1, an invisible colour difference is perceived, with Delta E=1-3, a very small colour difference visible only to the trained eye is perceived, with Delta E=3-5, a visible colour difference is perceived, and with Delta E>6, a clearly visible colour difference is perceived. In case of saturated colours, Lab Delta E is too large in comparison to the visual perception, while differences in brightness are not sufficiently taken into account. However, with regard to the rule that Delta E=1 is set as the limit of the discernable colour difference, there are also exceptions to the top and the bottom. With shades of grey, for example, Delta E values smaller than 1 are already visible as colour deviations. By contrast, with bright colours such as, for example, orange, hardly any colour difference is noticeable even with L*a*b Delta E=4.

However, smaller and, respectively, larger colour differences can also already be noticed by a trained eye or, respectively, with technical aids. For example, it is possible for a trained eye to already detect the colour effect according to the invention and thus the colour distance Delta E ($\Delta E$) of 0.1 in sealing elements with translucent or, respectively, transparent layers. A colour distance that rounds to 0 is also detectable by means of technical aids. In this context, so-called luminescent colours can be used in particular. This means that even if there is a colour distance Delta E (ΔE), e.g., 0.015, and no colour difference can be detected by the human eye, a very clear difference can be detected by the human eye with the help of technical aids, for example a black light lamp.

The change in the colour distance Delta E (ΔE) is determined using the model of a three-dimensional colour space in which the light intensity Delta L (ΔL) is perpendicular to the colour plane (a*, b*). The light intensity Delta L (ΔL) can assume values from 0 (black) to 100 (white).

With translucent sealing elements, it is of course somewhat more difficult for the eye of an observer to discern the colour effect according to the invention, since, on the whole, it is somewhat less pronounced. Nevertheless, the difference in colour of the carrier layer in the first and second states of the sealing element can be easily detected.

Translucent sealing elements can basically have any colour. However, colours such as, for example, white, beige, light grey, light yellow, yellow, orange, lime green, light blue, light grey, pink and lilac are preferably included. However, other colours are thereby not excluded of course. It also cannot be ruled out obviously that the colour distance Delta E (ΔE) in individual colours is higher than 7, e.g., 8, 9, 10, 15, 20, 25 or 30.

So as to be able to provide a clearly visible colour effect according to the invention for a viewer of sealing elements with an opaque adhesive layer and/or functional layers, it is envisaged in one embodiment of the invention that the area of the peeled-off layer with no or only small portions of the at least one colour display layer adhered to when the peeled-off layer is arranged congruently on the residue has a colour distance Delta E (ΔE) of at least 0 to 90, preferably of at least 7 to 50, as compared to the same area of the carrier layer in the first state in a viewing direction toward the carrier layer.

With sealing elements comprising an opaque adhesive layer and/or opaque functional layers, it is of course generally somewhat easier for the eye of an observer to discern the colour effect according to the invention, as it is normally more pronounced due to the intense or, respectively, covering effect of the opaque layers. As a result, the difference in colour of the carrier layer in the first and second states of the sealing element can be detected particularly well. The opaque functional layers and/or the opaque adhesive layer are generally intensely coloured so that the coloured appearance of the planar sealing element is not disturbed by a possibly also intensely coloured substrate.

Such sealing elements can basically have any colour. Advantageous colours, i.e., those that are particularly opaque or provide particularly good coverage, are, for example, black, blue, brown, dark grey and light grey. However, other colours are thereby not excluded of course.

The advantage associated therewith is that the colour impression or, respectively, the appearance of the sealing element is not disturbed by the substrate located underneath. This means that the colour impression which determines the security against manipulation is not disturbed by a colouring of the substrate. Such a sealing element can be applied to a substrate of any colour since the colour effect cannot be negatively influenced. The fact that the substrate is heavily patterned or intensely coloured is therefore also not disruptive.

Normally, sealing elements with an opaque adhesive layer and/or opaque functional layers can especially have colour distances Delta E (ΔE) in the range from 7 to 50 (wherein lower values—values of 2 to 4 are, for example, already clearly visible—or higher values are not excluded), however, especially with further technical aids, there is also the possibility of detecting higher and lower colour distances. A colour distance that rounds to 0 is also detectable by means of technical aids. In this context, so-called luminescent colours can be used in particular. In this context, the colour distance Delta E (ΔE) can be determined under a black light lamp so that colour differences of, for example, 0.015 can then also be detected by the human eye.

Since the invention can be implemented particularly well with calendered paper, it is envisaged in one embodiment of the invention that the carrier layer is made of calendered paper.

Papers in which a levelling and a smoothening of the surface occur during the paper production are referred to as calendered or satin paper. This means that, during the smoothening process, a smooth surface is produced under pressure from the still rough paper web. This is preferably achieved by using a calender during a rolling process. Appropriate calendering devices are already known in the prior art. Although the roughness of the paper is reduced during calendering, the smoothness that is thereby achieved is usually not as high as with blown, stretched or cast plastic films.

Calendered paper is therefore particularly well suited for the sealing element according to the invention, since transparent and, respectively, translucent paper can thereby be produced particularly well. A transparent or, respectively, translucent paper allows a user to detect the colour display layer arranged between the carrier layer and the adhesive layer just by looking at it. Or the user is able to detect—through the carrier layer—information attached below the carrier layer or below the sealing element.

However, opaque paper can of course also be produced by calendering.

It is envisaged in one embodiment of the invention that the sealing element furthermore comprises a second adhesion-controlling layer between the carrier layer and the adhesive layer in order to tear out at least parts of the at least one colour display layer when the carrier layer is being detached and to adhere them to the carrier layer. With such a structure of the sealing element, at least one symbol is created in the course of the detachment of the carrier layer, wherein at least one defined area is separated from the at least one colour display layer by the at least two adhesion-controlling layers, forming the at least one symbol. This means that the at least one symbol that is identifiable in the second state of the planar sealing element remains hidden from a viewer before the sealing element according to the invention is opened for the first time and is visually visible only after opening. The simplest form of a symbol is when the symbol corresponds to a complete area so that, when the sealing element is transferred to a second state, only the colour of the entire colour display layer covered by the removable layer changes. This is effected by applying the colour functional layers closely to the carrier layer, with the colour display layer being partially incorporated into the carrier layer. The planar sealing element thus appears, for example, light grey, dark grey or dark blue.

If the planar sealing element comprises additional colour display layers and/or adhesion-controlling layers, the peeled-off layer can be formed by the carrier layer and parts of or, respectively, complete further functional layers. In the simplest case, the residue forms only the adhesive layer and the colour display layer. If a sealing element has further functional layers, the residue can also comprise further layers or, respectively, parts of layers.

The removal and thus the transfer to the second state of the sealing element can be facilitated by a tab. In this case, the tab can constitute an additional element arranged on the carrier layer, or else it can constitute a part of the carrier layer to which no functional layers are applied and which protrudes laterally beyond the functional layers and the adhesive layer.

In case it is desired that the peeled-off layer does not separate completely from the remaining planar sealing element, an area can be provided at the edge of the sealing element, for example, in which area no adhesion-controlling layer(s) is/are applied so that the functional layers unite inseparably with the carrier layer. Complete removal of the peeled-off layer is therefore only possible by applying greater force, which, however, would normally damage the sealing element. Therefore, the peeled-off layer remains on the planar sealing element. As a result, the disappearance of the sealing element into the environment is reduced. The sealing element can thus be subject to mechanical recycling together with the substrate on which it is arranged.

The sealing element according to the invention can basically be applied to any substrate to which the adhesive layer adheres. Depending on the nature of the substrate, the composition of the adhesive layer can thus be adapted accordingly. However, the substrate will preferably be surfaces or a packaging made of the packaging materials paper, cardboard, paperboard or corrugated cardboard in order to be subject to mechanical recycling together with this substrate. However, substrates made of plastic, metal or glass can, of course, also be considered. Then, such substrates, however, often cannot be recycled together with the planar sealing element.

In order to be able to provide a paper as a carrier layer with particularly good properties, it is envisaged in one embodiment of the invention that the carrier layer made of paper has a mass per unit area of 8 $g/m^2$ to 150 $g/m^2$, preferably of 30 $g/m^2$ to 120 $g/m^2$, particularly preferably of 50 $g/m^2$. With a mass per unit area of 50 $g/m^2$, the transparency or, respectively, the translucency and the mechanical properties of the paper are ensured for a sealing element. Papers with grammages of up to 50 $g/m^2$ can be readily used as a see-through sealing element, whereas papers with higher grammages can be more suitable as covering sealing elements. Highly calendered papers with a mass per unit area of 50 $g/m^2$ to 90 $g/m^2$ are particularly suitable for covering variants of the sealing element.

In order to be able to produce carrier layers made of paper with a particularly good transparency or, respectively, translucency or even opacity and good processing properties, but still sufficient mechanical strength, it is envisaged in one embodiment of the invention that the carrier layer made of paper has a longitudinal breaking force in the range from 30N to 90N, preferably from 35N to 80N. This applies in particular to calendered papers, wherein low breaking force can reduce successful manipulation. For applications with an opaque carrier layer made of paper, such as for adhesive tapes, larger breaking forces can be useful so that the adhesive tape is sufficiently robust.

The measurement of the breaking force along the carrier layer or, respectively, the paper used for the production of the carrier layer is effected using a measuring method known in the prior art, namely according to ISO 1924-2.

In order to be able to produce an even more stable sealing element, it is envisaged in one embodiment of the invention that a further carrier layer is arranged between the functional layers and the adhesive layer or between two functional layers.

Preferably, this further carrier layer is, of course, also made of paper, since the planar sealing element can then be disposed of or, respectively, recycled as one. However, it cannot be ruled out that this second carrier layer is made of other cellulose products or of plastic, should this be necessary for special designs of the sealing element.

Said further carrier layer allows a more stable design of the sealing element, which may be desirable for adhesive tapes.

The further carrier layer could also contain information such as, for example, pin codes, which are completely or partially covered by the first carrier layer, but then become detectable when transferred to the second state, i.e., when opened.

In order to render the additional carrier layer tamper-proof as well, it can be secured against unnoticed removal with predetermined breaking punchings, or additional functional layers can, in turn, be allocated to it for a colour change.

The possible further carrier layer can be congruent with the first carrier layer, but also smaller or larger, in order to facilitate, for example, detachment of the first carrier layer.

This second carrier layer can have a transparent, translucent or opaque design, according to use in connection with the disclosed embodiments.

In order to be able to provide planar sealing elements that can be used as flexibly as possible, it is envisaged in one embodiment of the invention that the sealing element is a label.

Labels are understood to be, in particular, adhesive labels for the purpose of securing valuable or sensitive products and their packagings, or else for concealing codes or bar codes.

In order to enable the user him- or herself to determine the size of the sealing element depending on the application, it is envisaged in one embodiment of the invention that the planar sealing element is an adhesive tape. An adhesive tape allows to apply sealing elements that are larger or, respectively, longer in terms of area to an item of value or, respectively, its packaging, whereby unnoticed manipulation of the safeguard is made even more difficult. In order to allow a planar sealing element to be rolled up in the form of an adhesive tape, it is envisaged in one embodiment of the invention that the sealing element furthermore comprises a silicone layer on the carrier layer on the side facing away from the functional layers. The presence of the silicone layer allows the adhesive tape to be rolled up onto a roll because the silicone layer prevents the outside of the adhesive layer from adhering to the outside of the carrier layer. Rolling up allows for better and more space-saving storage, and an additional cover layer is furthermore eliminated due to the carrier layer functioning simultaneously as a cover layer.

In order to allow the planar sealing element to be stored before use without reducing the adhesive properties of the adhesive layer, it is envisaged in one embodiment of the invention that a siliconized cover layer made of paper or plastic is arranged on the adhesive layer on the side facing away from the functional layers to provide protection for the adhesive layer.

This cover layer prevents the planar sealing element from sticking undesirably to any substrate during storage, i.e., prior to being used as a safeguard. Due to the undesirable sticking, the planar sealing element could even be rendered unusable if there is strong adhesion because it can no longer be removed from the substrate without impairing the function.

In order to be able to provide a particularly easily removable temporary covering of the adhesive layer, it is envisaged in one embodiment of the invention that the cover layer is produced from siliconized, highly calendered paper or from siliconized polyethylene terephthalate.

In order to render manipulation more difficult by completely detaching the planar sealing element or to enable easier cutting through the sealing element for opening a packaging, it is envisaged in one embodiment of the invention that the planar sealing element has punchings.

Paper is generally less tear-resistant than plastic so that, if it is removed mechanically, e.g., by reaching under it with a blade, paper is more likely to tear anyway and any manipulation becomes visible. In particular, if a second carrier layer made of paper is provided on the adhesive layer, said second carrier layer can have punchings, such as perforations or predetermined breaking points.

Punchings through all layers also allow, for example, a planar sealing element to be torn off conveniently from a roll of sealing elements.

In general, by appropriately arranging several colour display layers and adhesion-controlling layers, several symbols can be displayed simultaneously in several differently coloured sub-areas, whereby the contrast of the colours in the first and second states of the sealing element is so great that the symbols are readily identifiable.

It can thus be envisaged that the defined area that has been cut out and is visible in the second state, i.e., the at least one symbol, of the at least one colour display layer, fails to adhere directly to the carrier layer or to the adhesive layer, but might also adhere indirectly via one or several further functional layers arranged on the carrier layer or, respectively, on the adhesive layer.

Something visually perceptible, e.g., a colour, a piece of information or a code, is created by the functional layers, or an effect arises as a result of adhesion-controlling layers, for example. This means that functional layers is the umbrella term for the colour display layers and the adhesion-controlling layers, for example. However, the term functional layers can also denote further colour display layers, further adhesion-controlling layers or merely intermediate layers, such as filling layers. Of course, it cannot be ruled out, either, that the functional layers are merely transparent or translucent if the carrier layer functions as the only colour layer.

The colour display layers can, in turn, comprise one or several build-up layers. This means that, depending on the colour of a colour display layer, the colour display layer comprises one or several build-up layers. Due to the printing process that takes place in practice, a conventional dark grey colour display layer comprises, for example, a white and black build-up layer. With the present invention, a sealing element that appears dark grey could also be produced using just a black build-up layer covered by a paper that is see-through in a milky fashion.

It would be conceivable that the functional layers are preferably applied on top of each other in a flexographic printing, screen printing, letterpress printing, offset printing or digital printing process.

Only by detaching the carrier layer, i.e., by transferring it to the second state, either a different colour impression or even a symbol will become visible. This means that, in a first state of the planar sealing element, the colour impression is different or, respectively, that the at least one symbol is not identifiable for a viewer, but the sealing element appears in any case as a unicoloured surface or, respectively, as a surface printed with many colours.

However, the colouring in the second state or, respectively, the hidden symbols are undetectable.

The individual colour display layers can have different or equal colours; they can be opaque, semi-opaque, translucent or transparent. A colour display layer could be composed of different colours in sections, which can be arranged, for example, in stripes or grids or in the form of images and/or patterns. A special case of the colour display layer contains no colour particles and therefore appears colourless.

Furthermore, it is not ruled out that the planar sealing element furthermore comprises a code, wherein the code is part of the sealing element, preferably part of the functional layers which are arranged between the carrier layer and the adhesive layer, and/or part of the adhesive layer. A (further) code could otherwise be located directly on the substrate, e.g., the packaging, and could be visible through the sealing element or could become visible only in the second state of the sealing element.

If reading of the code is to be prevented in a state of non-removal, at least one of the colour display layers can be opaque or contain an interference pattern or the code cannot stand out visually for other reasons or the paper of the carrier layer can be opaque.

The object of the invention is also achieved by a system made of a planar sealing element and a packaging object for goods. In this case, the sealing element corresponds to a sealing element as set forth in the embodiments of claims 1 to 13. The substrate mentioned in claims 1 to 13 is therefore the packaging object.

Especially packagings made of cardboard, metal, glass or plastic, which are suitable for packaging goods of different types, are thus regarded as a packaging object for goods. Particularly packagings for sensitive goods such as pharmaceuticals or technical devices, for which conscientious labelling is particularly important, can be regarded as examples of this. However, other types of packaging and/or goods are, of course, not excluded. The planar sealing element could be used for indicating the opening of the packaging object and/or for securely attaching tamper-proof features or object identification codes.

In this connection, according to the invention, it is envisaged in one embodiment of the system that all layers of the sealing element are transparent or have translucency at least in a congruent surface area (in this case, the carrier layer is always translucent, while the remaining layers are transparent or have translucency) so that identification of information for goods, which is attached underneath the adhesive layer on the surface of the packaging element, is possible at least in a partial area. The detection of information is therefore possible in the first state of the sealing element. It is therefore not necessary to open the sealing element in order to be able to read the information.

Transparent means that the translucency is 100%, i.e., that the sealing element is completely transparent and the information underneath the sealing element is identifiable and readable on the substrate.

This identification and reading can be done either with the naked eye of an observer or with the support of machines.

In another embodiment of the invention, it is envisaged that the carrier layer is translucent and the functional layers and/or the adhesive layer have opacity at least in a congruent surface area so that identification of information for goods, which is attached underneath the adhesive layer on the surface of the packaging element, is possible at least in a partial area.

For identification, it is not required that all the layers are completely clear and transparent.

It is particularly advantageous if the functional layers or, respectively, the adhesive layer each have, in this case, an opacity in the range from 0% to 70%, preferably from 0% to 50%. Opacity can be measured using ISO 2471.

In order to be able to ensure the identification of information for goods, which is attached underneath the adhesive layer on the surface of the packaging object, at least in a partial area, it is envisaged in a further embodiment of the invention that the carrier layer is translucent and the sealing element has opacity so that identification of information for goods, which is attached underneath the adhesive layer on the surface of the packaging element, is possible at least in a partial area.

In this context, it is particularly advantageous if the sealing element has an opacity in the range from 0% to 80%, preferably from 0% to 50%. This means that the sum of all layers of the sealing element results in an opacity in this area. Opacity can be measured using ISO 2471.

In order to make sure that the identification of information for goods, which is attached underneath the adhesive layer on the surface of the packaging element, is not possible at least in a partial area, it is envisaged in one embodiment of the invention that the carrier layer is translucent and the adhesive layer and/or the functional layers have opacity at least in a congruent surface area so that identification of information for goods, which is attached underneath the adhesive layer on the surface of the packaging element, is not possible at least in a partial area.

It is particularly advantageous if the functional layers and/or the adhesive layer have, in this case, an opacity in the range from 30% to 100%, preferably from 50% to 100%. Opacity can be measured using ISO 2471.

Only the opacities of the adhesive layer and of the functional layers are taken into account for this, but not the opacity of the carrier layer.

In order to make sure that the identification of information for goods, which is attached underneath the adhesive layer on the surface of the packaging element, is not possible at least in a partial area, it is envisaged in one embodiment of the invention that the sealing element has opacity so that identification of information for goods, which is attached underneath the adhesive layer on the surface of the packaging element, is not possible at least in a partial area.

In this context, it is particularly advantageous if the sealing element has an opacity in the range from 30% to 100%, preferably from 50% to 100%. This means that the sum of all layers of the sealing element results in an opacity in this area. Opacity can be measured using ISO 2471.

Of course, the planar sealing element must be adapted according to the nature and type of the surface, i.e., in terms of colour, pattern, etc., or, respectively, according to the information displayed.

The invention comprises at least the following examples of planar sealing elements:

Example 1 (the Simplest Embodiment), with the Layers Following One Another in the Order Listed carrier layer,
adhesion-controlling layer,
colour display layer,
adhesive layer.

Example 2

Herein, in addition to the layers in Example 1, the planar sealing element comprises at least two further functional layers, namely a further adhesion-controlling layer and a further colour display layer, so that symbols can be rendered visible in the planar sealing element.

Example 3

Herein, the planar sealing element comprises a carrier layer and an adhesive layer and two to four functional layers arranged in between. In addition, a further carrier layer, preferably made of paper, is arranged below the functional layers and on the adhesive layer. Further functional layers can be arranged above and below the further carrier layer, as required. It should be noted that the above-mentioned examples are not exhaustive, but merely serve to better illustrate the invention.

BRIEF DESCRIPTION OF THE FIGURES

The invention will now be explained in further detail using exemplary embodiments.

The drawings are exemplary and are intended to outline the idea of the invention, but are in no way intended to restrict or even exhaustively represent it.

Figure 1:
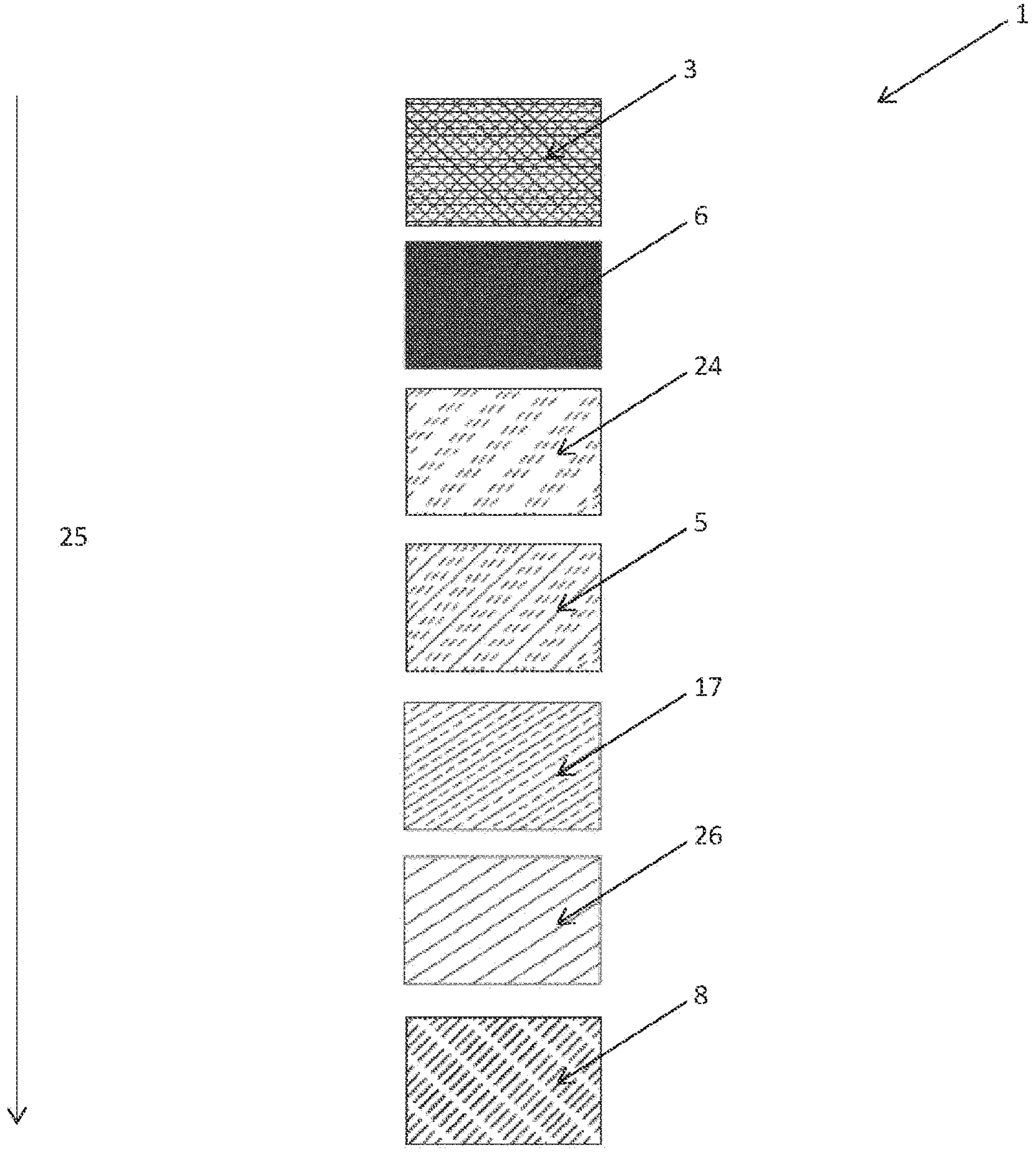
Figure 2A:
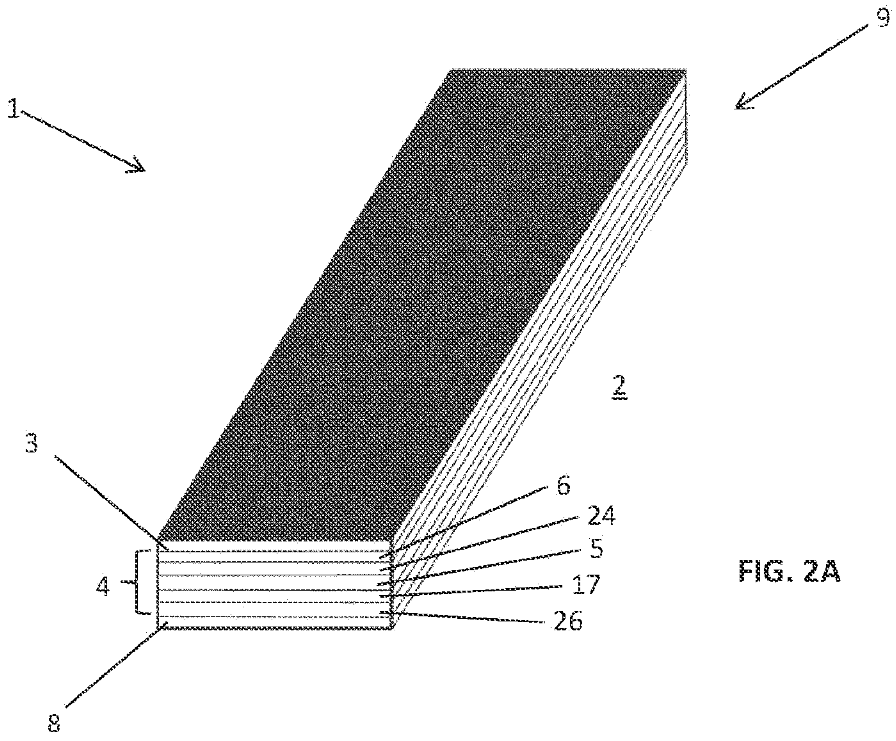
Figure 2B:
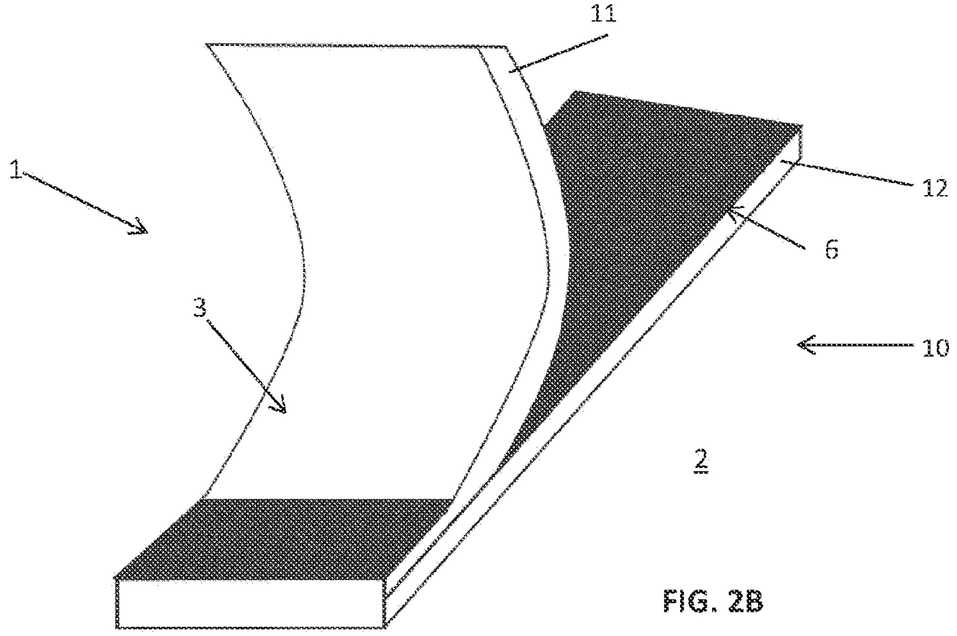
Figure 3:
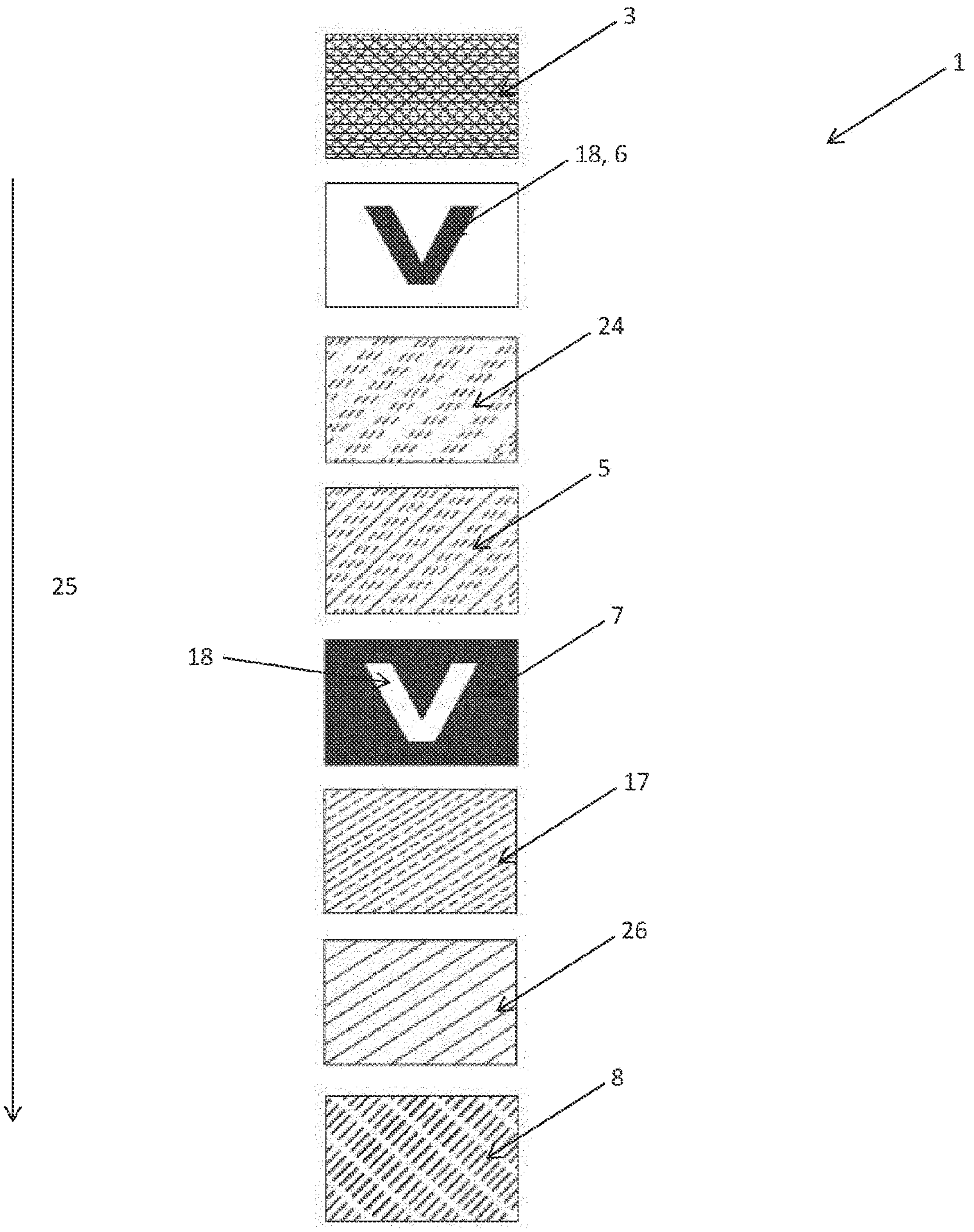
Figure 4A:
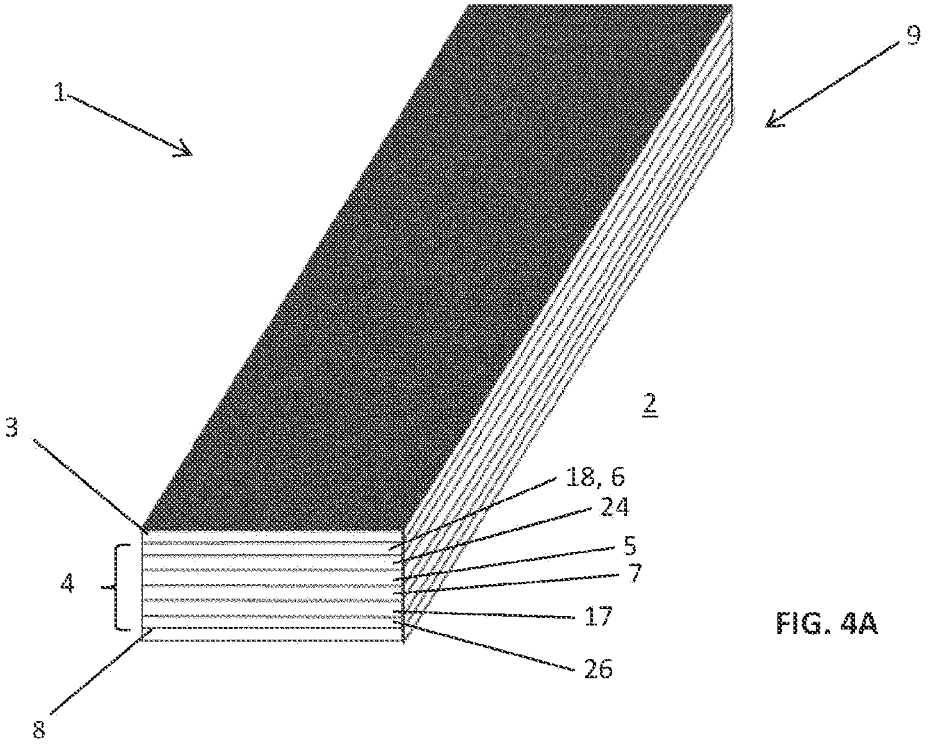
Figure 4B:
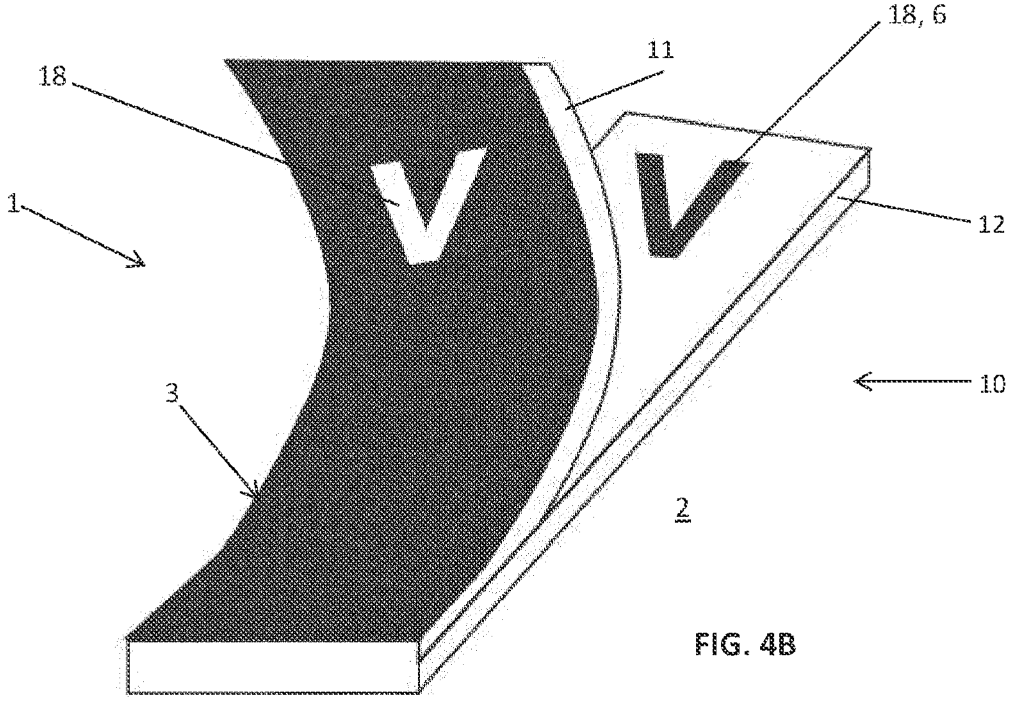

Therein:

FIG. 1 shows the schematic structure of a planar sealing element according to the invention with an adhesion-controlling layer, FIG. 2 shows the first (FIG. 2A) and second (FIG. 2B) states of the planar sealing element of FIG. 1, FIG. 3 shows the schematic structure of a sealing element according to the invention with two adhesion-controlling layers, FIG. 4 shows the first (FIG. 4A) and second (FIG. 4B) states of the planar sealing element of FIG. 3.

WAYS OF IMPLEMENTING THE INVENTION

FIG. 1 shows the roughly schematic structure of a simple embodiment of a planar sealing element 1 according to the invention, with all successive layers being shown one below the other.

The structure of a sealing element according to the invention is described below in a first direction 25 starting from the carrier layer 3 in the direction of the adhesive layer 8.

The planar sealing element 1 comprises a carrier layer 3 and an adhesive layer 8. The functional layers 4 are arranged between the carrier layer 3 and the adhesive layer 8. In this embodiment, the functional layers 4 comprise a colour display layer 5, an intermediate layer 24 and a first adhesion-controlling layer 6. The carrier layer 3 and the adhesive layer 8 each have two sides, with one of them facing the functional layers 4 and one of them facing away from the functional layers 4.

As illustrated in FIG. 1, a further colour display layer 17 can be present below the colour display layer 5 in order to obtain a special colour effect in the residue 12 (see FIGS. 2A, 2B). In addition, a further carrier layer 26, preferably made of paper, could also be present in order to reinforce the planar sealing element 1. Without the further colour display layer 17 and the further carrier layer 26, the simplest embodiment variant from Example 1, as mentioned above, would be present.

In this case, the carrier layer 3 of the planar sealing element 1 is produced from highly calendered paper. In the present example, the mass per unit area of the paper amounts to 50 g/m$^2$. In general, however, the paper used can have a mass per unit area of 8 $g/m^2$ to 150 $g/m^2$, preferably of 50 $g/m^2$. Furthermore, it has a translucency of 70%. In general, however, the paper used can, of course, also have a translucency that is higher than 70%.

The functional layers 4 and the adhesive layer 8 can have a transparent or likewise a translucent design. In this case, it becomes possible to read information arranged on the substrate 2 in the first and second states. Alternatively, the functional layers 4 and the adhesive layer 8 can have an opaque design. In this case, it is achieved that information arranged below the adhesive layer 8 and on the substrate 2 is not readable, but is completely covered. Furthermore, the colour appearance of the sealing element 1 is not disturbed by the substrate 2, either.

Due to the fact that the carrier layer 3 is produced from paper, it is possible to dispose of or, respectively, recycle the planar sealing element 1 together with the substrate 2 (see FIGS. 2A and 2B). That is to say, the substrate 2 will preferably be paper, cardboard, paperboard or corrugated cardboard. Of course, sealing elements 1 according to the invention could also be applied to other substrates 2, such as, for example, glass, metal or plastic, in order to achieve a high level of protection against manipulation by liquids.

The colour display layer 5 of the functional layers 4 is a commercially available varnish (a UV-curing or water-based varnish) or a printing ink, and the adhesion-controlling layer 6 is a so-called transparent release varnish, which comprises at least one silicone and/or at least one wax.

The adhesive layer 8 comprises a commercially available adhesive composition. In the present case, this is an acrylic-based or rubber-based pressure-sensitive adhesive, which can be, for example, dispersed, dissolved in solvent or applied as a hot melt. Alternatively, a heat-sealing adhesive could also be used to create a solid connection between the sealing element 1 and the surface of the substrate 2. As an alternative, a wet glue can be used. Other adhesives with advantageous recycling properties can also be used.

The adhesive layer 8 serves for the attachment of the planar sealing element 1 to any kind of substrate 2. The substrate 2 is preferably a packaging carton. Preferably, the adhesion to the substrate 2 of the sealing element 1 according to the invention by means of the adhesive layer 8 is so strong that the sealing element 1 can only forcibly be detached from the substrate 2 and will remain partially on the substrate 2 even during a detachment process of the sealing element 1, which will be described later.

In addition, the sealing element 1 can herein also include siliconization on the carrier layer 3 on the side facing away from the functional layers 4. Or the sealing element 1 can have a siliconized cover layer made of paper or plastic on the adhesive layer 8, on the side facing away from the functional layers 4, to provide protection for the adhesive layer. However, the presence of such a siliconization or siliconized cover layer is not mandatory. The siliconized cover layer can be produced from siliconized, highly calendered paper to allow a sealing element 1 to be wound up. The siliconized cover layer simultaneously functions as a support for the sealing element 1 before it is glued to the item to be sealed. This means that the siliconized cover layer allows the sealing element to be stored and delivered in a first state. In an even simpler variant of the sealing element 1 according to the invention, two functional layers 4 are arranged between the carrier layer 3 and the adhesive layer 8, the first functional layer 4 being an adhesion-controlling layer 6 and the second functional layer being a transparent or coloured colour display layer 5. In this case, the carrier layer 3 then serves as a colour display layer, since the carrier layer 3 made of paper is not completely transparent, but is translucent, i.e., appears milky and cloudy, and changes its colour impression between the first 9 and the second state 10.

FIG. 2 shows that the planar sealing element 1 according to the invention as per FIG. 1 is transferred from a first state 9, see FIG. 2A, to a second state 10, see FIG. 2B. It should be noted that the black colouring merely serves to better illustrate the colour change according to the invention and is not to be equated with the adhesion-controlling layer 6. In the first state 9, a sealing element 1 according to the invention is glued to a substrate 2 and closed, i.e., it has not been tampered with. Therefore, the sealing element 1 appears in its entirety, for example, as a cloudy, dark blue to a viewer who looks at the carrier layer 3 from the outside, since the colour display layer 5 is dark blue. Of course, it cannot be ruled out that the sealing element 1 according to the invention exhibits other colours or even colour combinations in the first state 9 and also in the second state 10. In the present exemplary embodiment, it is therefore a sealing element 1 that appears opaque to a viewer. However, it cannot be ruled out that the functional layers 4 and the adhesive layer 8 have a transparent or, respectively, translucent design so that the sealing element 1 appears see-through or, respectively, translucid to a viewer. Of course, other colours are excluded neither in the opaque nor in the transparent or, respectively, translucent embodiment.

The sealing element 1 according to the invention is transferred to a second state 10 by being opened. In a second state 10, both a residue 12 and a layer 11 that has been peeled off at least partially are visible. The residue 12 is the parts of the functional layers 4 remaining on the substrate 2 and the adhesive layer 8. The peeled-off layer 11 is the parts of the functional layers 4 that have been detached at least partially and the carrier layer 3.

As a result of the at least partial detachment of functional layers 4, what can now be seen in the residue 12 because of the existing adhesion-controlling layer 6, which produces an easily detachable connection between the colour display layer 5 and the carrier layer 3, is the dark blue colour layer, which is now coloured a little more intensely dark blue, while the peeled-off layer 11 appears milky-white. This means that the adhesion-controlling layer (the release varnish layer) 6 separates the carrier layer 3 and the colour display layer 5 from each other.

However, due to the adhesion-controlling layer 6, it also becomes impossible to apply the peeled-off layer 11 back onto the residue 12 without this being noticed. Hence, manipulation is already virtually impossible. If the peeled-off layer 11 is placed back congruently onto the residue 12, the residue 12 would appear in a lighter dark blue when viewed through the peeled-off layer 11.

The difference between colours is determined by the colour distance Delta E (ΔE), which represents the coordinate difference in the L*a*b or Luv colour space. Since these colour spaces are visually equidistant, this value can therefore be used for the visible difference between two colours. For this purpose, measurements were conducted in the L*a*b space, as standardized, for example, in EN ISO 11664-4 "Colorimetry—Part 4: CIE 1976 L*a*b* Colour space". The L*a*b space is a three-dimensional colour space in which the brightness value L* is perpendicular to the colour plane (a*,b*). Each colour in the colour space is defined by a colour location having the Cartesian coordinates {L*, a*, b*}. On the a* axis, green and red lie opposite each other, the b* axis runs between blue and yellow. The L* axis describes the brightness (luminance) of the colour with values from 0 (black) to 100 (white).

In the first state 9, the present sealing element 1, which comprises opaque functional layers 4 or, respectively, an opaque adhesive layer 8, appears in a cloudy dark blue with the values {L*=47.33, a*=12.49, b*=−33, 22}. In the second state 10, when the peeled-off layer 11 is placed congruently back onto the residue 12 and is glued thereon by pressing through the effect of the adhesion-controlling layer 6 and the peeled-off layer 11 is viewed from above, the latter appears in a dark blue with the values {L*=55.74, a*=6.89, b*=−22.51}, thus, in any case, whiter. The difference is therefore ΔL*=8.41, Δa*=−5.6, Δb*=10.71, and the Euclidean distance is thus ΔE*Lab=14.72. The layer 11 that has been glued back on therefore appears whiter than the sealing element 1 in the first state 9.

FIG. 3 schematically shows the structural design of another embodiment of a planar sealing element 1 according to the invention. The design of a sealing element 1 according to the invention as per FIG. 3 is described below in a first direction 25 starting from the carrier layer 3 in the direction of the adhesive layer 8.

As usual, the planar sealing element comprises a carrier layer 3 and an adhesive layer 8. The carrier layer 3 is produced from calendered paper like in FIG. 1, and the adhesive layer 8 comprises the adhesive composition like in FIG. 1.

Viewed in the first direction 25, the adhesive layer 8 is the layer furthest away from the carrier layer 3, i.e., all functional layers 4 are arranged between the carrier layer 3 and the adhesive layer 8.

Viewed in the first direction 25, the carrier layer 3 serves as a colour layer due to its milky appearance in the sense that it changes its colour impression and appears even milkier in the second state 10 in places in which no colour of the colour display layer 5 adheres to it (i.e., in the area of symbol V). The positive of a V, which represents the at least one symbol 18 in the present embodiment of the sealing element 1, is then applied to the carrier layer 3. The symbol 18 is applied as the first adhesion-controlling layer 6. In the present case, the adhesion-controlling layer 6 is a transparent release varnish with at least one silicone and/or at least one wax, like in FIG. 1.

The first adhesion-controlling layer 6 causes the surface tension to be reduced so that adjacent functional layers 4, in the present case the carrier layer 3, stick to a reduced extent or not at all.

Furthermore, an intermediate layer 24 is arranged on said adhesion-controlling layer 6. It goes without saying that this intermediate layer 24 is optional and therefore does not necessarily have to be present in every embodiment according to the invention of the invention.

It also goes without saying that more additional layers might be present, such as further colour display layers and further adhesion-controlling layers.

The colour display layer 5 as a further layer is then arranged as the next functional layer 4 below the carrier layer 3.

Since the first adhesion-controlling layer 6 has been applied only in the area of the symbol 18, i.e., of the V, the colour display layer 5 and the intermediate layer 24 unite inseparably with the carrier layer 3 outside of the V. These layers can no longer be detached from each other subsequently when the sealing element 1 is being opened. In the area of the first adhesion-controlling layer 6, the layers 5, 24, in turn, bond together just in an easily detachable manner. It should be noted that, accordingly, the black layer in the figures does not correspond to the adhesion-controlling layer 6, but only serves for better illustration.

Next, the negative of the symbol 18, i.e., of the V, is arranged as a further adhesion-controlling layer 7 on the colour display layer 5. This adhesion-controlling layer 7 is likewise a transparent release varnish with at least one silicone and/or at least one wax, like in FIG. 1. Optionally, a further colour display layer 17 can be present below the adhesion-controlling layer 7 in order to obtain a special colour effect in the residue 12 (see FIG. 4) and/or to separate the further colour display layer 17 from the adhesive layer 8 if no further carrier layer 26 is present. An optional further carrier layer 26, preferably made of paper, can be provided to reinforce the planar sealing element 1 and could also separate the adhesion-controlling layer 7 from the adhesive layer 8 if no further colour display layer 17 is present.

The adhesive layer 8 is arranged last.

The functional layers 4 are therefore only partially inseparably connected to each other, while other functional layers 4 or, respectively, parts thereof are connected to each other just in an easily detachable manner, namely where the two adhesion-controlling layers 6,7 are located.

Also in connection with this embodiment of a sealing element 1 according to the invention, it should be noted that it can be an opaque sealing element 1, i.e., a sealing element 1 in which the functional layers 4 or, respectively, the adhesive layer 8 has/have an opaque design, or a translucent sealing element, i.e., in which the layers 4, 8 have a translucent design.

FIG. 4 shows that the planar sealing element 1 according to the invention as per FIG. 3 can be transferred from a first state 9, see FIG. 4A, to a second state 10, see FIG. 4B. It should be noted that the black colouring merely serves to better illustrate the colour change according to the invention and is not to be equated with the adhesion-controlling layer 6. In the first state 9, a sealing element 1 according to the invention is glued to a substrate 2 and closed, i.e., it has not been tampered with, and the symbol 18 is not identifiable for a viewer. Therefore, the sealing element 1 appears in its entirety, for example, as a cloudy, dark blue to a viewer who looks at the carrier layer 3 from the outside. In the present exemplary embodiment, it is therefore a sealing element 1 that appears opaque to a viewer, i.e., a sealing element in which the functional layers 4 and the adhesive layer 8 have an opaque design. However, it cannot be ruled out that the functional layers 4 and the adhesive layer 8 have a transparent or translucent design so that the sealing element 1 appears translucid to a viewer. Of course, it cannot be ruled out that the sealing element 1 according to the invention exhibits other colours or even colour combinations in the first state 9 and also in the second state 10. If the peeled-off layer 11 is placed back congruently onto the residue 12, the residue 12, as viewed through the V (symbol 18) of the peeled-of layer 11, would appear in a dark blue, but no longer in such an intense dark blue, i.e., in a lighter dark blue, as in the first state 9, which is due to the milky-white colouring of the carrier layer 3 or, respectively, in the remaining area of the peeled-off layer 11 where the dark blue colour indeed adheres to the carrier layer 3.

The difference in the colour impression essentially corresponds to the difference in the brightness values L*, as explained in FIG. 1.

The sealing element 1 according to the invention is transferred to a second state 10 by being opened. In a second state 10, both a residue 12 and a layer 11 that has been peeled off at least partially can be seen. The residue 12 is the parts of the functional layers 4 remaining on the substrate 2 and the adhesive layer 8. The peeled-off layer 11 is the parts of the functional layers 4 that have been detached at least partially and the carrier layer 3.

As a result of the at least partial detachment of functional layers 4, the symbol 18 is now visible in the residue 12 or, respectively, in the peeled-off layer 11 because of the two adhesion-controlling layers 6, 7, which produce an easily detachable connection between the colour display layer 5 and the positive of the symbol 18, i.e., the V in the present case, and the carrier layer 3. This means that the first adhesion-controlling layer (the release varnish layer) 6 separates the carrier layer 3 and the colour display layer 5 from each other and provides for the colour design of the symbol 18.

As already mentioned, the symbol 18 is designed as a V in FIGS. 3 and 4. However, it goes without saying that the symbol can basically have any shape or, respectively, that several symbols 18 can even be combined with one another.

However, due to the two adhesion-controlling layers 6, 7, it also becomes impossible to apply the peeled-off layer 11 back onto the residue 12 without this being noticed. Hence, unnoticed manipulation is already virtually impossible. In addition, the contrast is significantly enhanced in the second state 10, whereby the indication of a manipulation is facilitated for the user. This is due to the change in the colour distance Delta E (ΔE) that is visible to a user. This is particularly readily identifiable for a user since the colour distance Delta E (ΔE) of the section in which, in the second state 10, no colour of the at least one colour display layer 5 adheres is preferably different by 0 to 90, preferably by at least 7 to 50, in the second state 10 when the peeled-off layer 11 is arranged congruently on the residue 12, compared to the first state 9.

Due to the fact that the carrier layer 3 is furthermore produced from calendered paper, the possibility of manipulation is reduced even further, since paper is indeed tear-resistant enough to serve as a carrier layer 3 for the sealing element 1 according to the invention, but is not tear-resistant enough to be easily removed and, consequently, tampered with. In addition, the carrier layer 3 is deformed when being transferred to the second state 10, since thin paper or, respectively, carrier layers 3 made of paper generally tend(s) to have edges that curl up.

In addition, there is the solubility of paper in relation to liquids, whereby a manipulation of the sealing element 1 with the help of solvents becomes visible. This means that, if a packaging object provided with the sealing element 1 made of paper according to the invention is placed in water for manipulation purposes, the water can quickly penetrate through the carrier layer 3, whereby at least one of these layers 4, 5, 8 in the wet or moistened state detaches at least partially from the carrier layer 3 made of paper, but without changing from a first state 9 to a second state 10. If the carrier layer 3 is now removed, there will subsequently be a residue 12 and a peeled-off layer 11, with none of the functional layers 4 adhering to the carrier layer 3 at least in parts. If the carrier layer 3 is removed in the wet or damp state, the carrier layer 3 can no longer be connected to the functional layers 4 in such a way that the sealing element 1 can again be transferred functionally from a first state 9 to a second state 10 as soon as it has dried.

However, if the substrate 2 is a "fibrous" substrate, such as, for example, corrugated cardboard or carton, it may happen that the complete sealing element in the first state 9 is pulled off or, respectively, torn off the substrate 2 with the uppermost layer of the substrate 2. In this case, the planar sealing element 1 will indeed be functional again after drying, but it will no longer be located on the desired substrate 2 and parts of the substrate 2 will adhere to the adhesive layer 8, which hinders reuse of the sealing element 1.

In the event that the planar sealing element 1 is transferred from a first 9 to a second state 10 due to moisture, the residue 12 then comprises the adhesive layer 8 and all functional layers 4, while the peeled-off layer 11 comprises only the carrier layer 3 without a functional layer 4 or the carrier layer 3 as well as parts of the functional layers 4. However, subsequently, the carrier layer 3 can no longer be applied to the detached functional layers 4 in such a way that a transfer from the first state 9 to the second state 10 is enabled, since no new connection of the carrier layer 3 to the functional layers 4 can be established.

However, if the sealing element 1 is dried after moistening without having been transferred from a first state 9 to a second state 10 or otherwise having been damaged or tampered with, the functionality according to the invention is restored so that the sealing element 1 can again be transferred from a first state 9 to a second state 10, whereby the colour effect according to the invention can be perceived.

Furthermore, in the illustrated exemplary embodiments, it would be conceivable that the planar sealing element 1 according to the invention has a tab (not shown) which is connected to the carrier layer 3. Said tab makes it easier for a user to remove the carrier layer 3 or, respectively, to transfer the sealing element 1 according to the invention from the first state 9 to the second state 10.

In case it is desired that the peeled-off layer 11 does not separate completely from the remaining planar sealing element 1, an area can be provided at the edge of the sealing element in which area no adhesion-controlling layer 6, 7 is applied so that the colour display layer 5 unites inseparably with the carrier layer 3. Complete removal of the peeled-off layer 11 is therefore only possible by applying greater force, which, however, would normally damage the sealing element 1. The peeled-off layer 11 thus remains on the planar sealing element 1 in an undamaged state. As a result, the disappearance of the sealing element 1 into the environment is reduced. Therefore, the sealing element 1 can likewise be subject to mechanical recycling.

Furthermore, it is noted that the embodiment variants of the sealing element according to the invention can basically be implemented also with an opaque carrier layer.

LIST OF REFERENCE NUMERALS

- 1 planar sealing element
- 2 substrate
- 3 carrier layer
- 4 functional layers
- colour display layer
- 6 first adhesion-controlling layer
- 7 second adhesion-controlling layer
- 8 adhesive layer
- 9 first state of the planar sealing element
- second state of the planar sealing element
- 11 peeled-offlayer
- 12 residue
- 13 -
- 14 -
- 15 -
- 16 -

17 additional colour display layer
18 symbol
19 -
24 intermediate layer
first direction
26 additional carrier layer

The invention claimed is:

1. A planar sealing element for application to a substrate, comprising a carrier layer, two or more functional layers, and an adhesive layer for attachment to a substrate,
the two or more functional layers comprising:
at least one color display layer,
a first adhesion-controlling layer, and
a second adhesion-controlling layer,
wherein the at least one color display layer lies between the first adhesion-controlling layer and the second adhesion-controlling layer, and the two or more functional layers are arranged between the carrier layer and the adhesive layer,
wherein the first adhesion-controlling layer is present only in a first symbol area to form a positive of a symbol and wherein the second adhesion-controlling layer is present only in a second symbol area to form a negative of the symbol,
wherein the carrier layer is made of paper with a mass per unit area of up to 120 g/$m^2$, and
wherein the carrier layer is at least partially detachable from at least the first adhesion-controlling layer in order to bring the sealing element from a first state to a second state, with the second state not being convertible into the first state,
the sealing element in the second state comprising a peeled-off layer and a residue,
wherein the peeled-off layer comprises at least the at least partially detached carrier layer and at least part of the at least one color display layer, and wherein the residue comprises at least the adhesive layer and at least part of the at least one color display layer and at least part of the first adhesion-controlling layer,
wherein the carrier layer is sufficiently translucent such that the peeled-off layer, in at least a first area in which no or only small portions of the at least one color display layer adhere, has a first color impression, in a viewing direction toward the carrier layer, when the sealing element is in the first state, and a second color impression when the peeled-off layer is arranged to again lie congruently on the residue, as in the first state, in a viewing direction toward the carrier layer,
wherein the first color impression and the second color impression are different, and
wherein the first area of the peeled-off layer in which no or only small portions of the at least one color display layer adhere, when the peeled-off layer is arranged to again lie congruently on the residue, has a color distance Delta E of more than 0.1 as compared to the same first area of the carrier layer in the first state, in a viewing direction toward the carrier layer.

2. A planar sealing element according to claim 1, wherein all layers are transparent or have translucency at least in a congruent surface area.

3. A planar sealing element according to claim 1, wherein the adhesive layer and/or the two or more functional layers is/are opaque at least in a congruent surface area.

4. A planar sealing element according to claim 3, wherein the area of the peeled-off layer in which no or only small portions of the at least one color display layer adhere, when the peeled-off layer is arranged to again lie congruently on the residue, has a color distance Delta E (ΔE) of at least 0 to 90 as compared to the same area of the carrier layer in the first state, in a viewing direction toward the carrier layer.

5. A planar sealing element according to claim 4, wherein the area of the peeled-off layer in which no or only small portions of the at least one color display layer adhere, when the peeled-off layer is arranged to again lie congruently on the residue, has a color distance Delta E (ΔE) of about 7 to about 50 as compared to the same area of the carrier layer in the first state, in a viewing direction toward the carrier layer.

6. A planar sealing element according to claim 1, wherein the area of the peeled-off layer in which no or only small portions of the at least one color display layer adhere, when the peeled-off layer is arranged to again lie congruently on the residue, has a color distance Delta E (ΔE) of more than 0 to 7.0 as compared to the same area of the carrier layer in the first state, in a viewing direction toward the carrier layer.

7. A planar sealing element according to claim 6, wherein the area of the peeled-off layer in which no or only small portions of the at least one color display layer adhere, when the peeled-off layer is arranged to again lie congruently on the residue, has a color distance Delta E (ΔE) of about 0.1 to about 5.0 as compared to the same area of the carrier layer in the first state, in a viewing direction toward the carrier layer.

8. A planar sealing element according to claim 6, wherein the area of the peeled-off layer in which no or only small portions of the at least one color display layer adhere, when the peeled-off layer is arranged to again lie congruently on the residue, has a color distance Delta E (ΔE) of about 0.1 to about 3.0, as compared to the same area of the carrier layer in the first state, in a viewing direction toward the carrier layer.

9. A planar sealing element according to claim 1, wherein the carrier layer has a mass per unit area in the range from 8 g/$m^2$ to 120 g/$m^2$.

10. A planar sealing element according to claim 9, wherein the carrier layer has a mass per unit area in the range from 30 g/$m^2$ to 120 g/$m^2$, or of 50 g/$m^2$.

11. A planar sealing element according to claim 1, further comprising a further carrier layer arranged between the two or more functional layers and the adhesive layer or between two of the two or more functional layers.

12. A planar sealing element according to claim 1, wherein the sealing element is a label.

13. A planar sealing element according to claim 1, wherein the sealing element is an adhesive tape.

14. A planar sealing element according to claim 1, wherein a siliconized cover layer made of paper or plastic is arranged on the adhesive layer on the side facing away from the two or more functional layers to provide protection for the adhesive layer.

15. A planar sealing element according to claim 1, wherein the planar sealing element has punchings in order to render manipulation more difficult by a complete detachment or to enable easier cutting through the sealing element for opening a packaging.

16. A system made of a planar sealing element according to claim 1 and a packaging object for goods.

17. A system according to claim 16, wherein all layers are transparent or have translucency at least in a congruent surface area so that identification of information for goods, which is attached underneath the adhesive layer on the surface of the packaging element, is possible at least in a partial area.

18. A system according to claim 16, wherein the sealing element has opacity so that identification of information for goods, which is attached underneath the adhesive layer on the surface of the packaging element, is not possible at least in a partial area.

19. A planar sealing element for application to a substrate, comprising a carrier layer, two or more functional layers, and an adhesive layer for attachment to a substrate, the two or more functional layers comprising:

at least one color display layer, a first adhesion-controlling layer, and a second adhesion-controlling layer, wherein the at least one color display layer lies between the first adhesion-controlling layer and the second adhesion-controlling layer, and the two or more functional layers are arranged between the carrier layer and the adhesive layer, wherein the first adhesion-controlling layer is present only in a first symbol area to form a positive of a symbol and wherein the second adhesion-controlling layer is present only in a second symbol area to form a negative of the symbol, wherein the carrier layer is made of calendered paper with a mass per unit area of up to 120 $g/m^2$, and wherein the carrier layer is at least partially detachable from at least the first adhesion-controlling layer in order to bring the sealing element from a first state to a second state, with the second state not being convertible into the first state, the sealing element in the second state comprising a peeled-off layer and a residue, wherein the peeled-off layer comprises at least the at least partially detached carrier layer and at least part of the at least one color display layer, and wherein the residue comprises at least the adhesive layer and at least parts of the at least one color display layer and at least part of the first adhesion-controlling layer, wherein the carrier layer is sufficiently translucent such that the peeled-off layer, in at least a first area in which no or only small portions of the at least one color display layer adhere, has a first color impression, in a viewing direction toward the carrier layer, when the sealing element is in the first state, and a second color impression when the peeled-off layer is arranged to again lie congruently on the residue, as in the first state, in a viewing direction toward the carrier layer, wherein the first color impression and the second color impression are different, and wherein the first area of the peeled-off layer in which no or only small portions of the at least one color display layer adhere, when the peeled-off layer is arranged to again lie congruently on the residue, has a color distance Delta E of more than 0.1 as compared to the same area of the carrier layer in the first state, in a viewing direction toward the carrier layer.

* * * * *